United States Patent [19]

Kirtland

[11] Patent Number: 5,218,702

[45] Date of Patent: Jun. 8, 1993

[54] SYSTEM FOR SELECTING REQUEST FOR A RESOURCE BEFORE DECODING OF REQUESTED RESOURCE ADDRESS AND VALIDATING SELECTION THEREAFTER

[75] Inventor: Charles W. Kirtland, Austin, Tex.

[73] Assignee: Motorola, Inc., Schaumburg, Ill.

[21] Appl. No.: 532,159

[22] Filed: Jun. 4, 1990

Related U.S. Application Data

[63] Continuation of Ser. No. 215,852, Jul. 6, 1988, abandoned.

[51] Int. Cl.⁵ .......................................... G06F 13/18
[52] U.S. Cl. ............................... 395/725; 364/937.01; 364/948; 364/964.9; 364/261.2; 364/DIG. 2; 392/425
[58] Field of Search ................. 395/425, 325, 725; 340/825.5

[56] References Cited

U.S. PATENT DOCUMENTS

| | | | |
|---|---|---|---|
| 4,339,808 | 7/1982 | North | 364/900 |
| 4,541,043 | 9/1985 | Ballegeer et al. | 364/200 |
| 4,578,782 | 3/1986 | Kraft et al. | 364/900 |
| 4,787,032 | 11/1988 | Culley | 364/200 |
| 4,947,368 | 8/1990 | Donaldson et al. | 395/325 |
| 5,142,682 | 8/1992 | Lemay et al. | 395/725 |

OTHER PUBLICATIONS

Blum "Look-ahead access request circuit for computer systems", IBM TDB vol. 22, No. 3, Aug. 1979, pp. 1059–1060.

*Primary Examiner*—Thomas C. Lee
*Attorney, Agent, or Firm*—Walter W. Nielsen; Harold C. McGurk IV

[57] ABSTRACT

An arbitration system and method are provided for arbitrating access to a system resource such as a memory, wherein the address decode and arbitration portions of the arbitration cycle occur simultaneously thereby reducing the overall arbitration cycle time.

11 Claims, 1 Drawing Sheet

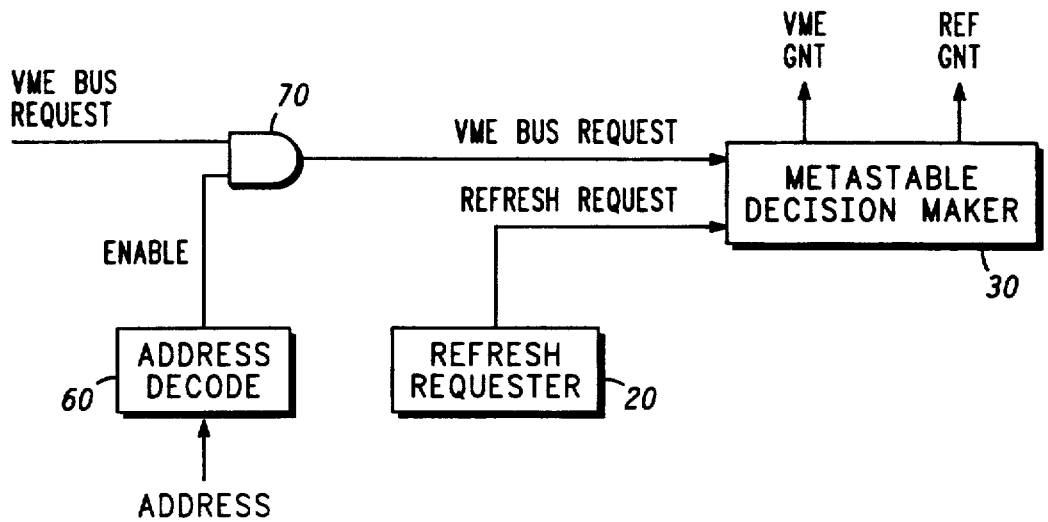
FIG. 1
—PRIOR ART—
FIG. 2
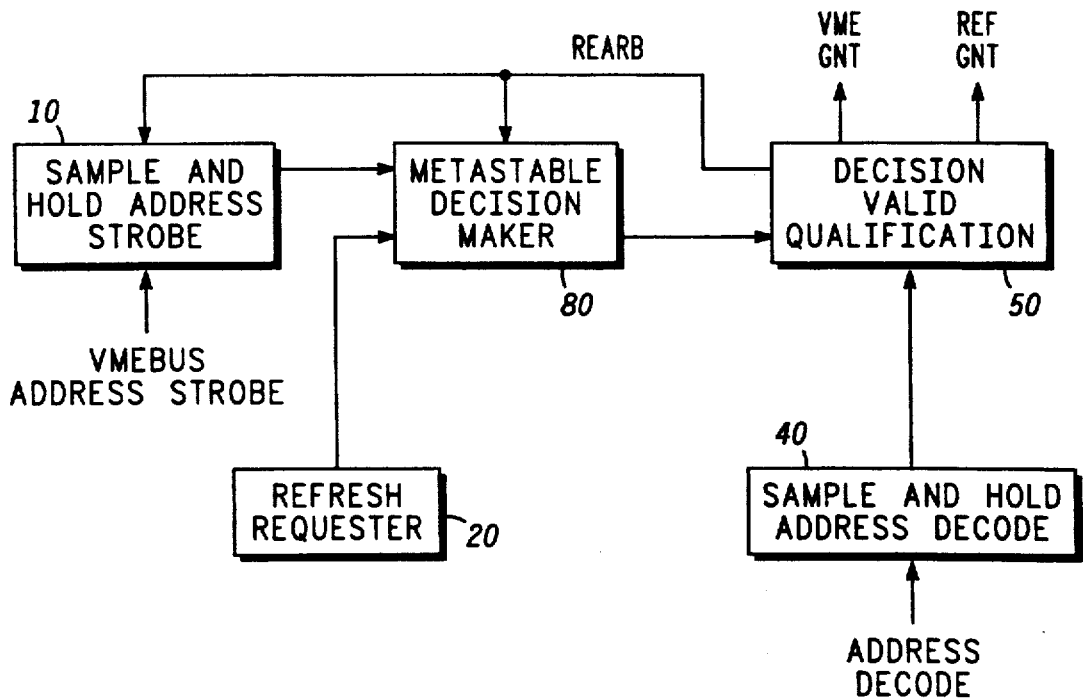

SYSTEM FOR SELECTING REQUEST FOR A RESOURCE BEFORE DECODING OF REQUESTED RESOURCE ADDRESS AND VALIDATING SELECTION THEREAFTER

This application is a continuation of prior application Ser. No. 07/215,852, filed Jul. 6, 1988, now abandoned.

BACKGROUND OF THE INVENTION

This invention relates, in general, to arbitration systems and methods for an asynchronous bus computer system, and more particularly, to an arbitration system and method wherein the address decode and arbitration functions occur simultaneously thereby providing for a faster arbitration decision and therefore shorter overall arbitration cycle time.

There are currently available arbitration systems and methods for asynchronous bus computer systems. However, in each of these systems the address decode portion of an arbitration cycle is completed prior to beginning the actual arbitration decision which results in granting of a given resource to the selected requester. This results in a longer total time required to reach a given arbitration decision. While this additional time cost for each arbitration decision was relatively negligible with some older computer systems running at relatively low clock speeds, it has become a more significant factor at the higher clock speeds of more recent computer systems.

SUMMARY OF THE INVENTION

It is therefore an object of the present invention to provide an arbitration system and method for asynchronous bus computer systems with shorter overall arbitration cycle time.

Another object of the present invention is to provide an arbitration system and method for asynchronous bus computer systems wherein the address decode portion and the actual arbitration decision portion of an arbitration decision cycle are performed simultaneously thereby reducing the overall cycle time for a given arbitration cycle.

The above and other features and objects are achieved in the present invention wherein there is provided an asynchronous bus arbitration system comprising an address strobe sample and hold circuit for receiving an address strobe signal. The output of the address strobe sample and hold circuit is coupled to the input of a metastable decision maker. A refresh requestor for providing a periodic refresh signal has an output coupled to an additional input of the metastable decision maker, the output of which is coupled to an input of a decision valid qualification circuit having VME GNT, REF GNT, and ReARB outputs. The ReARB output of the decision valid qualification circuit is coupled to the metastable decision maker and the address strobe sample and hold circuit. An address decode sample and hold circuit for receiving an address decode signal has an output coupled to the decision valid qualification circuit.

BRIEF DESCRIPTION OF THE DRAWINGS

The above mentioned and other features of the invention and the manner of attaining them will become more apparent and the invention itself will be best understood by reference to the following description of an embodiment of the invention taken in conjunction with the accompanying the drawings wherein:

FIG. 1 is a general block diagram of a typical prior art arbitration system for an asynchronous bus computer system; and FIG. 2 is a block diagram of a preferred embodiment of the present invention.

DETAILED DESCRIPTION OF THE DRAWINGS

FIG. 1 illustrates in block diagram form a typical prior art arbitration system wherein address decode element 60 for receiving an address is coupled to AND gate 70 having as an additional input a VME bus request. The output of AND gate 70 as well as the output of refresh requester 20 is coupled to metastable decision maker 30 having outputs VME GNT and REF GNT. Refresh requester 20 comprises a circuit or system which generates a periodic refresh request signal used to refresh the information contained in a memory for example. The VME bus request input to AND gate 70 comprises a request on an asynchronous computer bus, for example a VME bus, for access to a given resource, in this case a memory. The address input to address decode 60 is an address which indicates which resource is being requested on the asynchronous bus. Address decode 60 requires a finite amount of time in order to decode the address and send an enable signal which indicates that it is this specific resource that is being requested. Once it has been determined that the request in question is for this particular resource, the request is passed through gate 70 to metastable decision maker 30. At this point metastable decision maker 30 decides which request is to be passed through and allows access to the resource by granting access to either the asynchronous request from the bus, in this case a VME GNT signal, or it grants access to the periodic refresh request by transmitting a refresh grant signal, REF GNT. The asynchronous request via the VME bus is not passed to the metastable decision maker 30 until the specific address has been decoded indicating that the request is in fact for this particular resource. This is the amount of time it takes for address decode 60 to actually decode the address and provide an enable signal as an input to AND gate 70. The arbitration decision made by metastable decision maker 30 is therefore not begun until the complete address has been decoded indicating that the request is in fact for this particular resource. The delay time required to decode the entire address is therefore added to the actual decision time of metastable decision maker 30 to determine the amount of time required for an entire arbitration decision cycle.

FIG. 2 illustrates a simplified block diagram of the present invention wherein the address decode and actual arbitration decision are made simultaneously. Sample and hold element 10 for receiving a VME bus address strobe signal is coupled to metastable decision maker 80 as is refresh requester 20. The output of metastable decision maker 80 is coupled to decision valid qualification element 50. Sample and hold element 40 for receiving an address decode signal is also coupled to decision valid qualification element 50. Decision valid qualification element 50 provides a ReARB output to metastable decision maker 80 and sample and hold element 10 as well as VME GNT and REF GNT outputs.

In operation sample and hold element 40 operates in a fashion similar to address decode element 60 of the prior art by decoding the actual address signal to indicate whether or not a specific resource is being addressed. The result of this decoding is provided to decision valid qualification element 50. Sample and hold element 10 is used to receive a request for a resource on an asynchronous bus, in this case a VME bus address strobe signal, which indicates that a resource is being addressed but does not indicate which specific resource. This signal is passed through as an input to metastable decision maker 30. Refresh requester 20 acts as before to provide a periodic refresh request signal to periodically refresh the memory. This periodic refresh request signal is also input to metastable decision maker 80.

Once metastable decision maker 80 has made an arbitration decision between the two competing request inputs, the output is passed to decision valid qualification element 50. Decision valid qualification element 50 now decides whether or not to act upon the arbitration decision from metastable decision maker 30 based on the input from sample and hold element 40. If the address decode signal indicates that the request was in fact for this particular resource, decision valid qualification element 50 allows the arbitration decision from metastable decision maker 80 to be passed on and provide either a VME grant or REF grant signal as an output. If the output from sample and hold element 40 indicates that the request was not in fact for this particular resource, decision valid qualification element 50 ignores the output of metastable decision maker 80 and sends a ReARB signal back to metastable decision maker 80 and sample and hold element 10 to essentially reset and prepare for a subsequent arbitration decision.

It can be seen then that metastable decision maker 80 is allowed to provide an arbitration decision between a VME bus request and a refresh request regardless of whether or not the VME bus request was in fact for this specific resource. However, that arbitration decision is not acted upon by decision valid qualification element 50 unless the output signal from sample and hold element 40 indicates that this request was in fact for this specific resource. In the event that it was not, the entire system is simply reset for the next arbitration decision. If the address does in fact decode for this particular resource the arbitration decision is passed through and allowed to be acted upon by the remainder of the computer system. This results in a significant time saving in that the arbitration decision is allowed to proceed at the same time as the address decode rather than having to wait until the address is decoded to start the actual arbitration decision process. There are various specific timing signals which must be provided among the various elements depicted; however, these are dependent upon the specific computer system involved and can be implemented as required.

What has been provided therefore is an improved arbitration system for an asynchronous bus computer system wherein the arbitration decision and address decode decision portions of an arbitration decision cycle are allowed to occur simultaneously thereby reducing the total time required for the overall arbitration decision. While this system has been described in conjunction with a specific asynchronous computer system bus it is to be clearly understood that this description is made only by way of example and not as a limitation of the scope of the invention.

I claim:

1. An arbitration system for granting access to a resource coupled to a bus of a computer system, said arbitration system comprising:
    refresh request means for generating a periodic refresh request signal;
    address decode means, coupled to said bus, for receiving and decoding a resource address and providing an address decode output signal;
    address strobe detection means, coupled to said bus, for detecting an address strobe signal on said bus which indicates that an addressed resource is being requested and having as an output an address strobe detection signal;
    decision means coupled to said refresh request means and coupled to said address strobe detection means for simultaneously selecting the output of one of said refresh request means and address strobe detection means to pass through as the output of said decision means while said address decode means is receiving and decoding said resource address; and
    decision valid qualification means coupled to said decision means and said address decode means for receiving said output signals of said decision means and said address decode means, and for providing an output signal responsive to said output signal of said decision means when said address decode output signal corresponds to an address of said resource.

2. The arbitration system of claim 1 wherein said address strobe detection means comprises a sample and hold circuit.

3. The arbitration system of claim 1 wherein said address decode means comprises a sample hold circuit.

4. The arbitration system of claim 2 wherein said decision means comprises a metastable decision maker.

5. The arbitration system of claim 1 wherein said bus comprises an asynchronous bar.

6. The arbitration system of claim 1 wherein said system resource comprises a memory.

7. In a computer system having a resource, a method for providing an arbitration decision between a refresh request signal and a resource request signal, wherein the resource request signal comprises an address strobe signal and a resource address signal, said method comprising the steps of:
    (a) detecting an address strobe signal;
    (b) providing a periodic refresh request signal;
    (c) making a preliminary arbitration decision between said address strobe signal and said refresh request signal;
    (d) simultaneously decoding said resource address signal while step (c) is making said preliminary arbitration decision;
    (e) making a final arbitration decision, corresponding to said preliminary arbitration decision, if said resource address signal from said decoding step corresponds to an address of said resource; and
    (f) providing a reset signal if said resource address signal from said decoding step does not correspond to said address of said resource.

8. The method of claim 7 wherein said bus comprises an asynchronous bus.

9. The method of claim 7 wherein said preliminary arbitration decision making step is accomplished with a metastable decision maker.

10. The method of claim 9 wherein said detecting step is accomplished with a sample and hold circuit.

11. The method of claim 10 wherein said decoding step is accomplished with a sample and hold circuit.

* * * * *